United States Patent [19]
Bigus

[11] Patent Number: 5,704,012
[45] Date of Patent: Dec. 30, 1997

[54] ADAPTIVE RESOURCE ALLOCATION USING NEURAL NETWORKS

[75] Inventor: Joseph Phillip Bigus, Rochester, Minn.

[73] Assignee: International Business Machines Corporation, Armonk, N.Y.

[21] Appl. No.: 454,977

[22] Filed: May 31, 1995

Related U.S. Application Data

[62] Division of Ser. No. 134,953, Oct. 8, 1993, abandoned.
[51] Int. Cl.$^6$ .................... G06F 1/00; G06F 15/18
[52] U.S. Cl. .................... 395/22; 395/21; 395/24; 395/27
[58] Field of Search .................... 395/22, 20, 21, 395/24, 27; 382/155, 156, 157, 158, 159

[56] References Cited

U.S. PATENT DOCUMENTS

| | | | |
|---|---|---|---|
| 5,325,525 | 6/1994 | Shan et al. | 395/650 |
| 5,483,468 | 1/1996 | Chen et al. | 364/551.01 |
| 5,598,076 | 1/1997 | Neubauer et al. | 348/568.22 |

OTHER PUBLICATIONS

Moerke, T.P. and Xin Feng. "A new combined neural network and data visualization method for computer system performance and capacity planning." Southcon /92. Conference Record, Orlando, FL, Mar. 10–12, 1992, pp. 213–218.

Primary Examiner—Tariq R. Hafiz
Assistant Examiner—Jason W. Rhodes
Attorney, Agent, or Firm—Roy W. Truelson; Owen J. Gamon

[57] ABSTRACT

In a system comprising a plurality of resources for performing useful work, a resource allocation controller function, which is customized to the particular system's available resources and configuration, dynamically allocates resources and/or alters configuration to accommodate a changing workload. Preferably, the resource allocation controller is part of the computer's operating system which allocates resources of the computer system. The resource allocation controller uses a controller neural network for control, and a separate system model neural network for modelling the system and training the controller neural network. Performance data is collected by the system and used to train the system model neural network. A system administrator specifies computer system performance targets which indicate the desired performance of the system. Deviations in actual performance from desired performance are propagated back through the system model and ultimately to the controller neural network to create a closed loop system for resource allocation.

1 Claim, 16 Drawing Sheets

FIG. 6

| | | | | |
|---|---|---|---|---|
| System Config. | MPL | | MPL 1 | 1 |
| | | | MPL 2 | 2 |
| | | | MPL 3 | 3 |
| | | | MPL 4 | 5 |
| | Memory | | Poolsize 1 | 50 |
| | | | Poolsize 2 | 50 |
| | | | Poolsize 3 | 75 |
| | | | Poolsize 4 | 25 |
| Input Data | Workload | Util. | CPU Utilization | 0.72 |
| | | | I/O Utilization | 0.60 |
| | | CPU QLen | CPU Mean Queue Len | 1.76 |
| | | | Job Class A Queue Len | 0.50 |
| | | | Job Class B Queue Len | 0.49 |
| | | | Job Class C Queue Len | 0.35 |
| | | | Job Class D Queue Len | 0.40 |
| | | I/O QLen | I/O Mean Queue Len | 1.50 |
| | | | Job Class A Queue Len | 0.53 |
| | | | Job Class B Queue Len | 0.18 |
| | | | Job Class C Queue Len | 0.32 |
| | | | Job Class D Queue Len | 0.40 |
| | | Page Faults | Page Fault Rate 1 | 10.97 |
| | | | Page Fault Rate 2 | 4.28 |
| | | | Page Fault Rate 3 | 2.25 |
| | | | Page Fault Rate 4 | 1.92 |
| Output Data | System Perf. | Response Times | Class A Avg Response Time | 1.09 |
| | | | Class B Avg Response Time | 2.72 |
| | | | Class C Avg Response Time | 1.24 |
| | | | Class D Avg Response Time | 1.34 |

FIG. 7

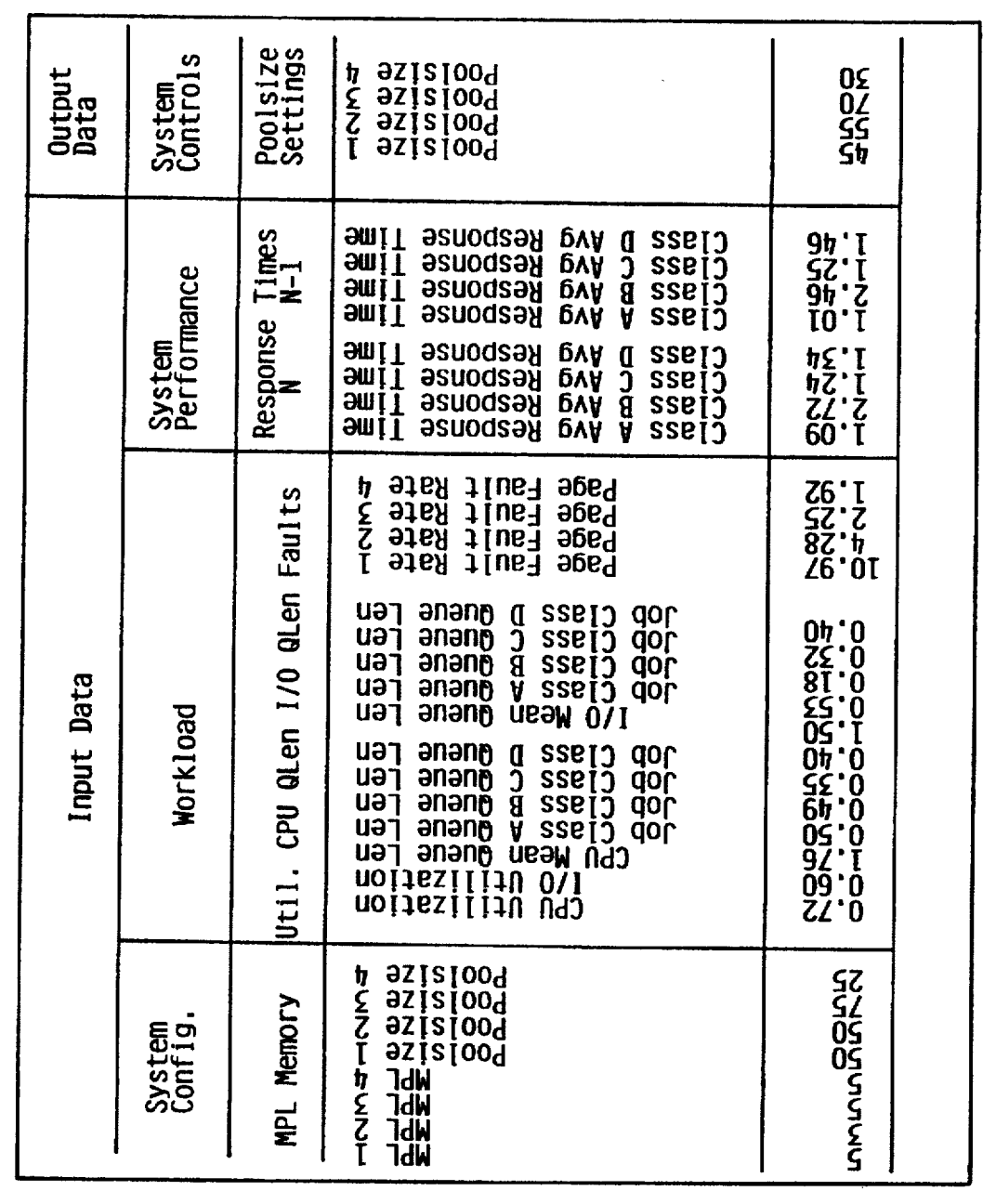

| Input Data | | | | | Output Data | | |
|---|---|---|---|---|---|---|---|
| System Config. | Workload | | | | System Controls | | |
| MPL Memory | Util. CPU QLen I/O QLen Faults | | | Response Times N | Response Times N-1 | Poolsize Settings | |
| MPL 1 | CPU Utilization | 0.72 | | | | | |
| MPL 2 | I/O Utilization | 0.60 | | | | | |
| MPL 3 | CPU Mean Queue Len | 1.76 | | | | | |
| MPL 4 | Job Class A Queue Len | 0.50 | | | | | |
| Poolsize 1 | Job Class B Queue Len | 0.49 | | | | | |
| Poolsize 2 | Job Class C Queue Len | 0.35 | | | | | |
| Poolsize 3 | Job Class D Queue Len | 0.40 | | | | | |
| Poolsize 4 | I/O Mean Queue Len | 1.50 | | | | | |
| | Job Class A Queue Len | 0.53 | | | | | |
| | Job Class B Queue Len | 0.18 | | | | | |
| | Job Class C Queue Len | 0.32 | | | | | |
| | Job Class D Queue Len | 0.40 | | | | | |
| | Page Fault Rate 1 | 10.97 | | | | | |
| | Page Fault Rate 2 | 4.28 | | | | | |
| | Page Fault Rate 3 | 2.25 | | | | | |
| | Page Fault Rate 4 | 1.92 | | | | | |
| | | | Class A Avg Response Time | 1.09 | | | |
| | | | Class B Avg Response Time | 2.72 | | | |
| | | | Class C Avg Response Time | 1.24 | | | |
| | | | Class D Avg Response Time | 1.34 | | | |
| | | | | Class A Avg Response Time | 1.01 | | |
| | | | | Class B Avg Response Time | 2.46 | | |
| | | | | Class C Avg Response Time | 1.25 | | |
| | | | | Class D Avg Response Time | 1.46 | | |
| | | | | | Poolsize 1 | 45 | |
| | | | | | Poolsize 2 | 55 | |
| | | | | | Poolsize 3 | 70 | |
| | | | | | Poolsize 4 | 30 | |

(System Config values: MPL 1=5, MPL 2=5, MPL 3=5, MPL 4=5, Poolsize 1=50, Poolsize 2=50, Poolsize 3=75, Poolsize 4=25)

ADAPTIVE RESOURCE ALLOCATION USING NEURAL NETWORKS

This is a divisional of application Ser. No. 08/134,953 filed on Oct. 8, 1993, abandoned.

CROSS REFERENCE TO RELATED APPLICATION

The present application is related to commonly assigned copending U.S. patent application Ser. No. 08/134,764, filed Oct. 8, 1993, to Bigus, entitled "Adaptive Job Scheduling Using Neural Network Priority Functions", which is herein incorporated by reference.

FIELD OF THE INVENTION

The present invention relates to resource allocation within a computer system, and in particular to resource allocation based upon a model of a computer system.

BACKGROUND OF THE INVENTION

Early digital computer systems were single user machines. That is, a single program or job took control of the entire computer, monopolizing all of its resources such as the CPU, memory, secondary disk storage and peripherals such as terminals and printers. It was quickly realized that this was a very inefficient use of costly computer hardware. Additionally, each program had to directly control the computer hardware devices. Computer software called operating systems were developed to handle the low level interface with computer hardware devices, and to allow sharing of the computer resources by more than one user at a time.

It is the operating system's task to maximize the amount of work that a set of users can perform on a given computer system. The set of user jobs (called the workload) is usually divided into separate job classes. Typical job classes are: interactive (data entry), programming (program editing and compilation), and batch (accounting, data base queries, etc.). Jobs in each job class may require very different amounts of the computer system resources.

One of the major functions performed by computer operating system is resource allocation. Resource allocation involves giving user jobs access to the computer system's resources, such as the central processing unit (CPU), main memory, input/output devices, etc. Over the years many different resource allocation algorithms have been developed for computer systems.

The algorithms used for scheduling the various types of computer resources vary. Most of the resource scheduling algorithms are heuristic, i.e. they are based on rules of thumb. Such systems generally work well, but they often perform poorly when conditions get out of the expected range, or when the system changes. Unfortunately, modern computer systems change quite often. A single computer system can change by altering the size of available main memory, altering the amount of secondary storage available, upgrading to a faster CPU, etc. In a computer network, where a set of computer systems communicate with each other on a high speed connection, the makeup of the "system" may be in a constant state of flux, as individual computer systems are connected to and disconnected from the network system.

In addition to the changes in the computer system configuration, there is also a constantly changing workload. The workload is the combination of all of the work which users submit to the computer system for processing. This workload changes periodically with the time of day, day of week, and even the time of year, and may also change permanently over time. It is extremely difficult to derive a set of rules or heuristics for resource allocation which anticipates all of these variations in operating conditions.

Other, more sophisticated, resource allocation algorithms rely on models of the underlying system or process. These models relate how the resources are used in the system and how the lack or availability of the resource impacts computer system performance. Once a model of the resource's relationship to the system exists, one can make predictions about the effects of our resource allocation decisions. One can 'pretend' to take some action, run it through our model, and compare the predicted outcome to our desired system state. Today, computer systems are modelled primarily using a mathematical technique known as queueing theory. Queueing theory allows highly skilled technical people to construct relatively accurate models of computer systems. However, there is usually a large cost associated with constructing a queueing theory model of a system. Furthermore, the model is specifically constructed for a single computer system (or a very similar class of machines). The more flexibility allowed in the queueing theory model, the less accurate the resulting model.

In order to overcome the limitations of the prior art, there is a need to build models of computer systems that may be changed once they are installed in the field, and to account for changes in the user workload, and the effects of that on the system performance.

SUMMARY OF THE INVENTION

It is a principal object of the present invention to provide an enhanced method and apparatus for allocating resources in a system which performs useful work.

Another object of this invention to provide an enhanced method and apparatus for allocating resources in a computer system.

Another object of this invention is to provide a more flexible resource allocation method and apparatus which will dynamically respond to changes in available system resources and configuration.

Another object of this invention is to provide an enhanced technique for managing system resources, through use of a neural network model of the system, along with a neural network adaptive controller.

Another object of this invention is to provide an enhanced method and apparatus for constructing a computer system model.

Another object of this invention is to provide a more efficient technique for constructing accurate computer system performance models.

Another object of this invention is to provide a technique for constructing a unique computer system performance model for any computer system, regardless of hardware and software configuration or workload.

Another object of this invention is to use neural networks to serve as the computer system performance models.

These and other objects are accomplished by the method for adaptive operating system control using neural networks disclosed herein.

In a system comprising a plurality of resources for performing useful work, a resource allocation controller function, which is customized to the particular system's available resources and configuration, dynamically allocates resources and/or alters configuration to accommodate a changing workload.

In the preferred embodiment, the system is a computer system, and the resource allocation controller is part of the computer's operating system. The resource allocation controller includes a controller neural network for determining the required resource allocation and a resource manager for allocating resources in response to that determination. Training data is generated using a model of the computer system, which is implemented as a separate neural network.

A computer system performance monitor collects data on the current activity in the computer system, storing the performance data in data files. This performance data contains information regarding the computer system configuration, the computer system resources, the workload, and the resulting computer system performance. Thus, for a given set of resources, configuration and workload that has been experienced by the system and recorded by the performance monitor, the response (performance) of the system is known. This performance data is used to train the neural network system model, creating a customized and accurate model of the computer system performance relationships for its configuration and workload.

A system administrator specifies computer system performance targets which indicate the desired performance of the system. Using the neural network computer system model, training data for the controller neural network is generated by inputting a set of actual configurations and workloads, and receiving a corresponding set of error data. From this data, an adjustment of the controller parameters can be determined for any given level of workload and desired performance. The controller neural network is thus trained, taking as inputs the desired performance levels, and giving as outputs the configuration, i.e., decisions as to how the computer system resources should be allocated to reach those performance goals.

In accordance with the preferred embodiment of the present invention, two fundamental ideas are combined in order to manage the resources in a computer system. First, a neural network is used to build an accurate model of the computer system performance relationships to its resources and workload. Second this accurate model is used to construct an adaptive controller, again using neural networks, in order to provide much better control than is possible with the old queueing theory and heuristic based resource management algorithms.

BRIEF DESCRIPTION OF THE DRAWING

FIG. 6 shows the layout of the training data for the neural network system model used in the preferred embodiment;

FIG. 7 shows the layout of the training data for controller neural network 202 of the preferred embodiment;

DESCRIPTION OF THE PREFERRED EMBODIMENT

Figure 1:
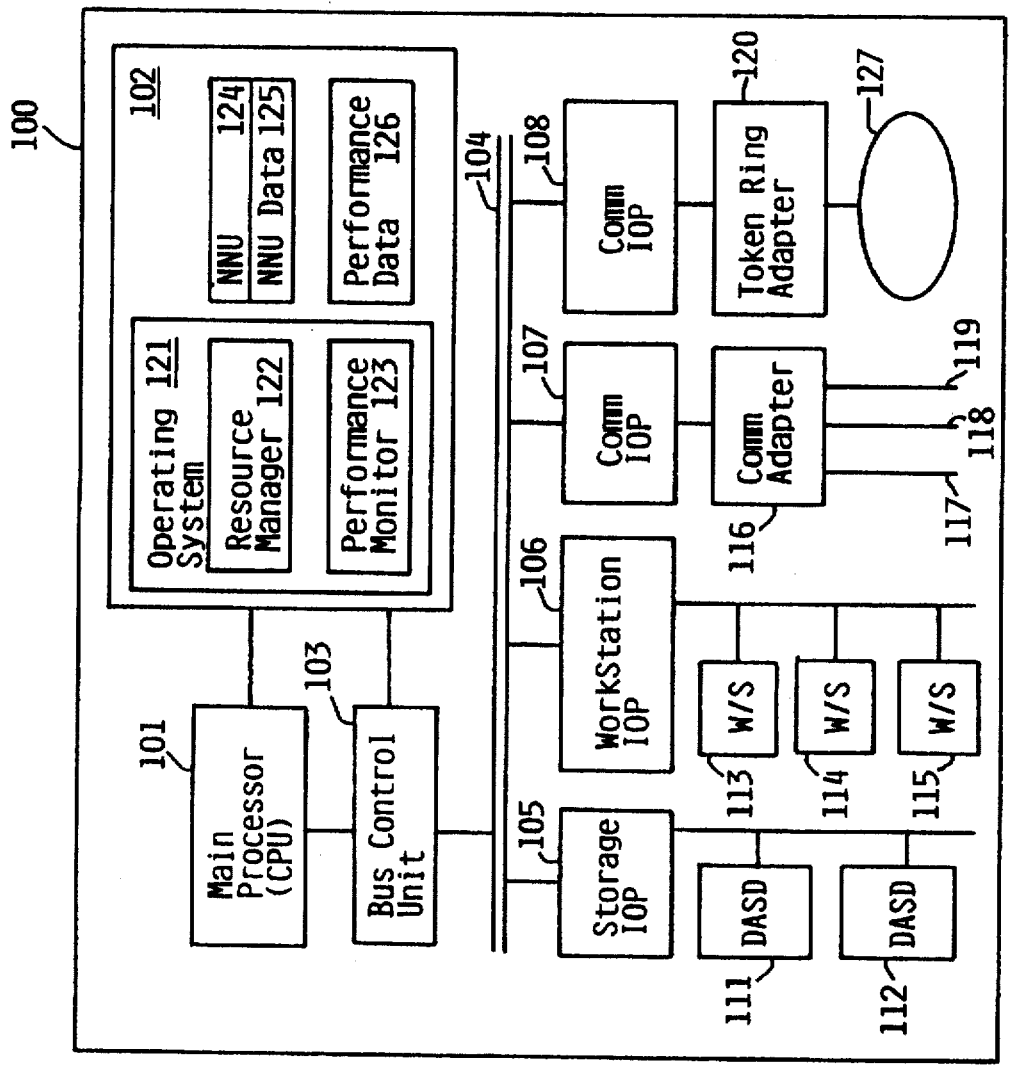
FIG. 1 shows a high level block diagram of the computer system according to the preferred embodiment of the present invention.

FIG. 1 shows a high level block diagram of the computer system according to the preferred embodiment of the present invention. Computer system 100 comprises central processing unit or units (CPU) 101 connected to system random access memory 102, and to bus control unit 103. Bus control unit 103 connects CPU 101 and memory 102 to one or more input/output processors (IOPs) via system I/O bus 104. IOPs include storage IOP 105, workstation IOP 106, and communications IOPs 107 and 108. Storage IOP 105 connects to and controls one or more direct access storage devices (DASD) 111-112. WorkStation IOP 106 connects a set of user terminals or workstations 113-115. Communications IOP 107 connects to and controls one or more communication lines 117-119 through communications adapter 116. Communications IOP 108 connects to token ring local area network 127 through token ring adapter 120. Communications lines 117-119 and token ring local area network 127 may in turn connect to other computer systems, workstations, and I/O devices.

Certain software components and data structures required for practicing the present invention in accordance with the preferred embodiment reside in memory 102 as shown, or may be stored in DASD 111,112 when not required in memory, as is known in the art. Operating system 121, performs functions typical of a computer operating system as are known in the art. Additionally, operating system 121 contains resource manager 122 and performance monitor 123. Resource manager 122 regulates the size of various memory pools in response to determinations made by a controller neural network, as described in greater detail herein. Performance monitor 123 gathers statistics relevant to the performance of computer system 100. Statistics gathered by performance monitor 123 are stored in performance data files 126. Neural network utility 124 and associated data files 125 are used to construct, train and execute neural networks for modelling computer system 100 and determining the adjustments required of resource manager 122.

It should be understood that the number, type and configuration of I/O devices, I/O processors and other components may vary. A computer system according to this invention may contain a single system I/O bus or may contain multiple buses. Different types of I/O processors may be present in the system, including multi-function I/O processors which perform the function of more than one type of I/O processor. Different types of I/O devices may be present, such as optical storage devices, optical character readers, voice I/O devices, etc. In addition, system 100 may be a multi-processor system, comprising a plurality of central processing units. In the preferred embodiment, computer system 100 is an IBM Application System/400 midrange computer, although any computer system could be used.

Figure 2:
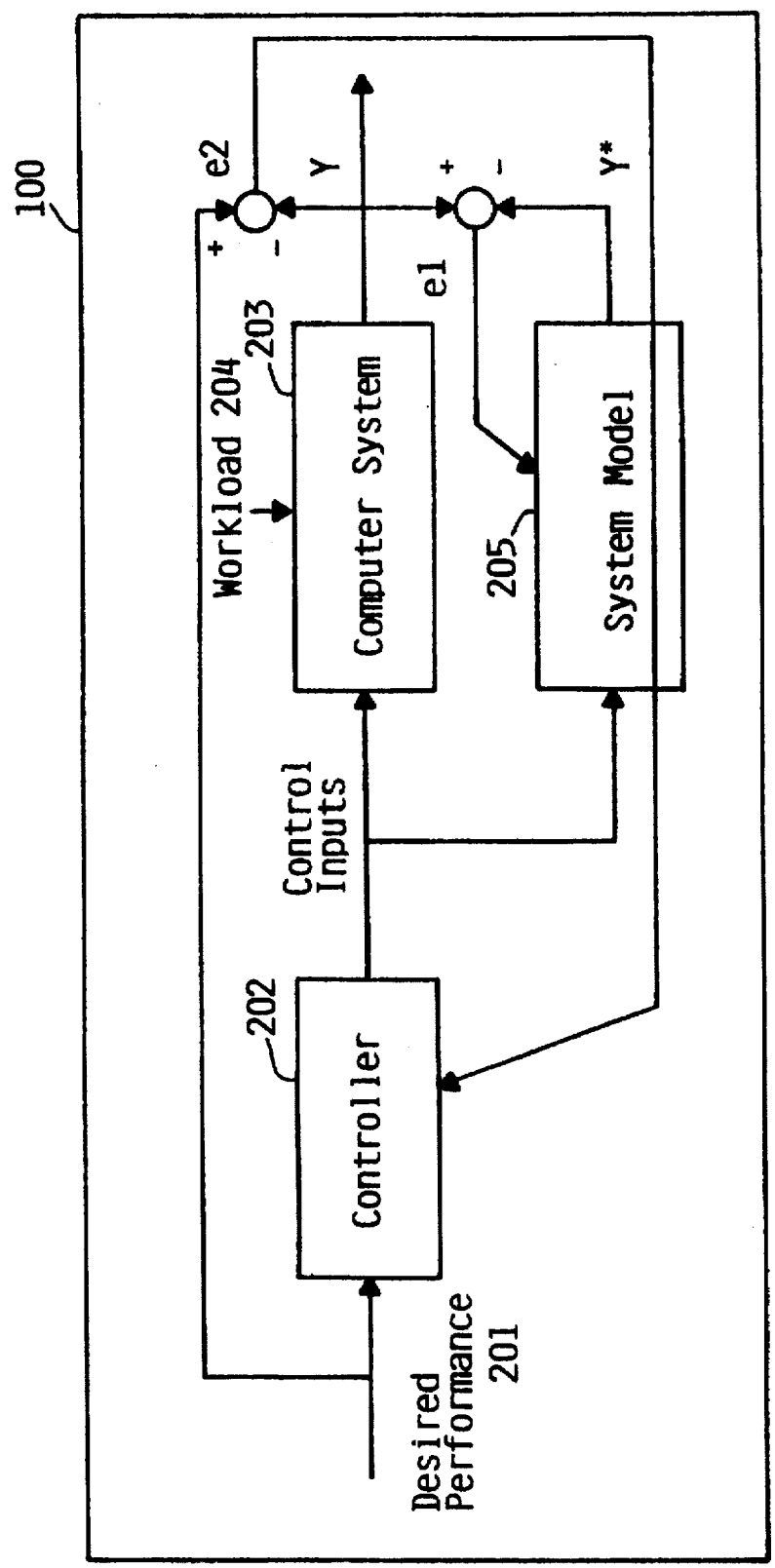
FIG. 2 shows how the resource allocation controller of the regulates a computer system according to the preferred embodiment.

FIG. 2 shows how the resource allocation controller of the present invention regulates a computer system.

Conceptually, this can be viewed as a closed loop control system. The desired performance objective 201 is input to controller neural network 202. The controller neural network outputs control signals to the computer system 203. In the preferred embodiment, these control signals determine the allocation of memory to various memory pools. However, these control signals can be any of the operating system parameters which can be set by a user, including multiprogramming levels, job priorities, and paging parameters. Computer system 203 is subjected to a varying workload 204 consisting of a set of user and system jobs.

System model 205 is a neural network which is trained using the error E1. E1 is the error between the actual system performance Y and the predicted performance Y* made by the neural network model System model 205 is trained to mimic the behavior of computer system 203. E2 is the error between the desired performance objectives 201 and the actual system performance Y. This error is used to train controller neural network 202 using any suitable training algorithm. In the preferred embodiment, E2 is passed back through the neural network system model, which provides error derivative information which can then be used to train the controller neural network. This process iterates until the error E2 goes to zero.

In the preferred embodiment, controller 202 and system model 205 are constructed using artificial neural networks. Neural network utility 124 is a program for execution on CPU 101 which simulates a neural network. Neural network data structures 125 define the type of network to be simulated, the topology of the nodes, the adaptive weights to be assigned to the data paths, and other parameters. In the preferred embodiment, utility 124 is the IBM Neural Network Utility and data structures 125 are those data structures defined and used by the IBM Neural Network Utility. The operation of the IBM Neural Network Utility and its associated data structures is described in U.S. Pat. No. 5,142,665 to Bigus, issued Aug. 25, 1992, in U.S. Pat. No. 5,235,673 to Austvold et al., issued Aug. 10, 1993, and in commonly assigned U.S. patent application Ser. No. 07/986,889, filed Dec. 3, 1992, entitled "Apparatus and Method for Facilitating Use of a Neural Network", all of which are incorporated herein by reference.

The IBM Neural Network Utility used in the preferred embodiment supports simulation of several different types of neural networks on a single processor. A data structure representing the type and topology of the network is stored. For example, the number of inputs, number of outputs, data types of input and output, number of hidden nodes, connections between nodes, etc., are defined in the data structure. Additionally, a data conversion template may define a data type conversion for data entering and leaving the network. This data structure is shown in FIG. 1 as element 125.

It should therefore be understood that while FIG. 2 shows controller 202 and system model 205 connected to inputs and outputs, these devices are physically implemented as artificial neural networks executing on CPU 101 in the preferred embodiment. Resource manager 122 is a portion of operating system 121 which calls neural network utility 124 to perform the required analysis, receives the outputs from controller neural network 202, and performs the indicated allocation of memory pools. However, in an alternative embodiment it would be possible to implement these devices as actual hardware neural networks connected as shown in FIG. 2.

Figure 3:
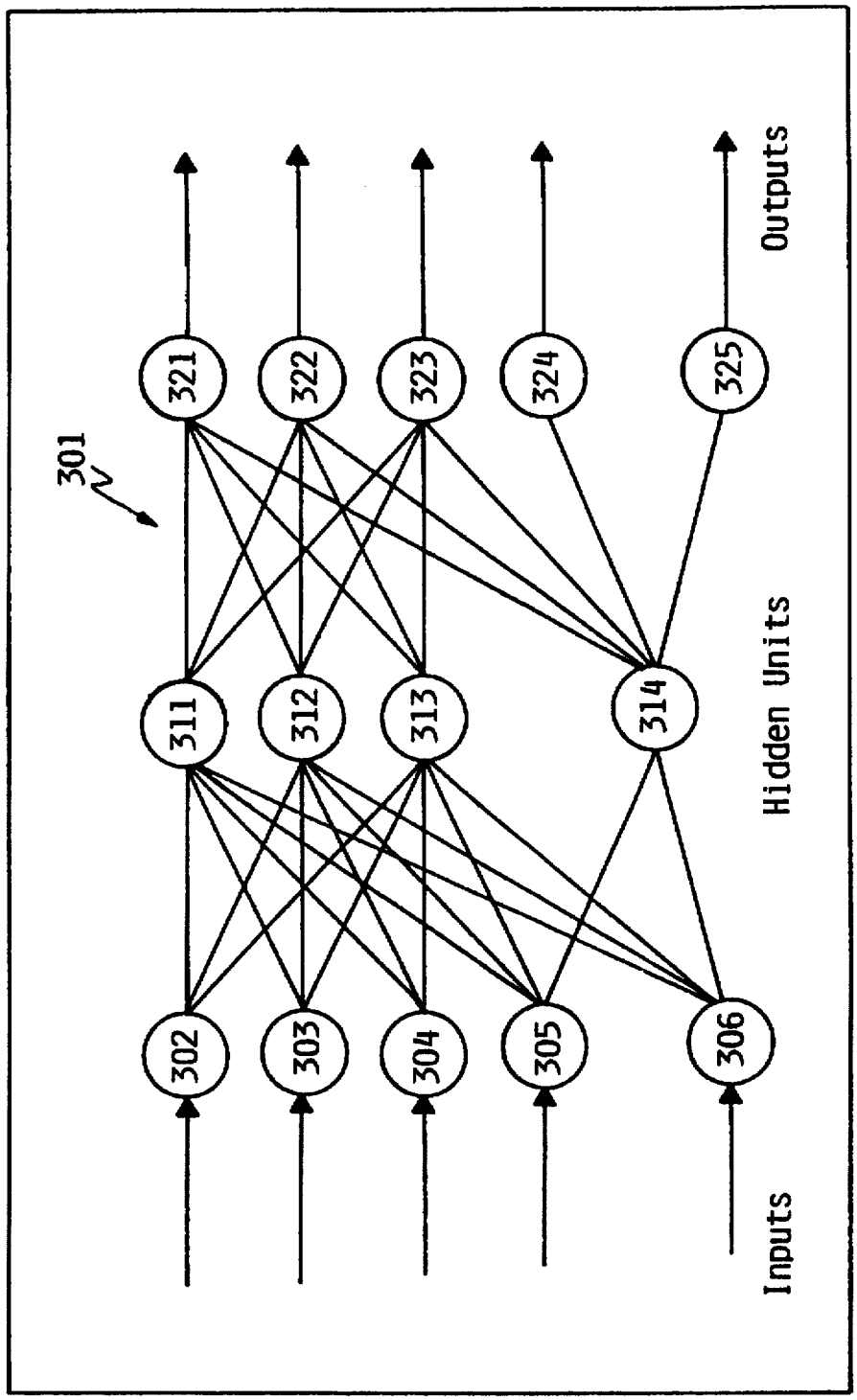
FIG. 3 is a conceptual diagram of a typical neural network according to the preferred embodiment.

FIG. 3 is a conceptual diagram of a typical neural network 301 used in controller 202 and in system model 205 in accordance with the preferred embodiment. A separate neural network 301 is used for the controller and for the system model, and these may vary in exact configuration. A neural network comprises a set of processing elements and adaptive weighted connections. Neural network 401 is preferably a feedforward neural network. The network comprises a plurality of input nodes 302–306, a plurality of hidden nodes 311–314, and a plurality of output nodes 321–325.

Data enters on the left at input nodes 302–306. Data flows through the neural network from left to right, being processed by the processing units and attenuated by the connection weights. The result of the computation appears on the output nodes. Many other topologies of neural networks exist. While one layer of hidden nodes 311–314 is shown in FIG. 3, the number of hidden layers (0,1, or more) can vary, along with the layout of the interconnections between processing units. Some neural networks have feedback connections. Many different training algorithms exist in the art for adapting (training) these neural networks. Those skilled in the art could substitute alternative neural network architectures for both the neural network system model and the neural network controller.

It should be understood that FIG. 3 represents the neural network of the preferred embodiment in a conceptual sense only. In physical reality, this network is simulated by neural network utility 124 executing on CPU 101 in accordance with parameters stored in data structures 125. However, the network could be constructed as physical hardware processors and data links, or using a custom neural network processing chip. The neural network operates in 2 distinct phases, training and execution.

Figure 4:
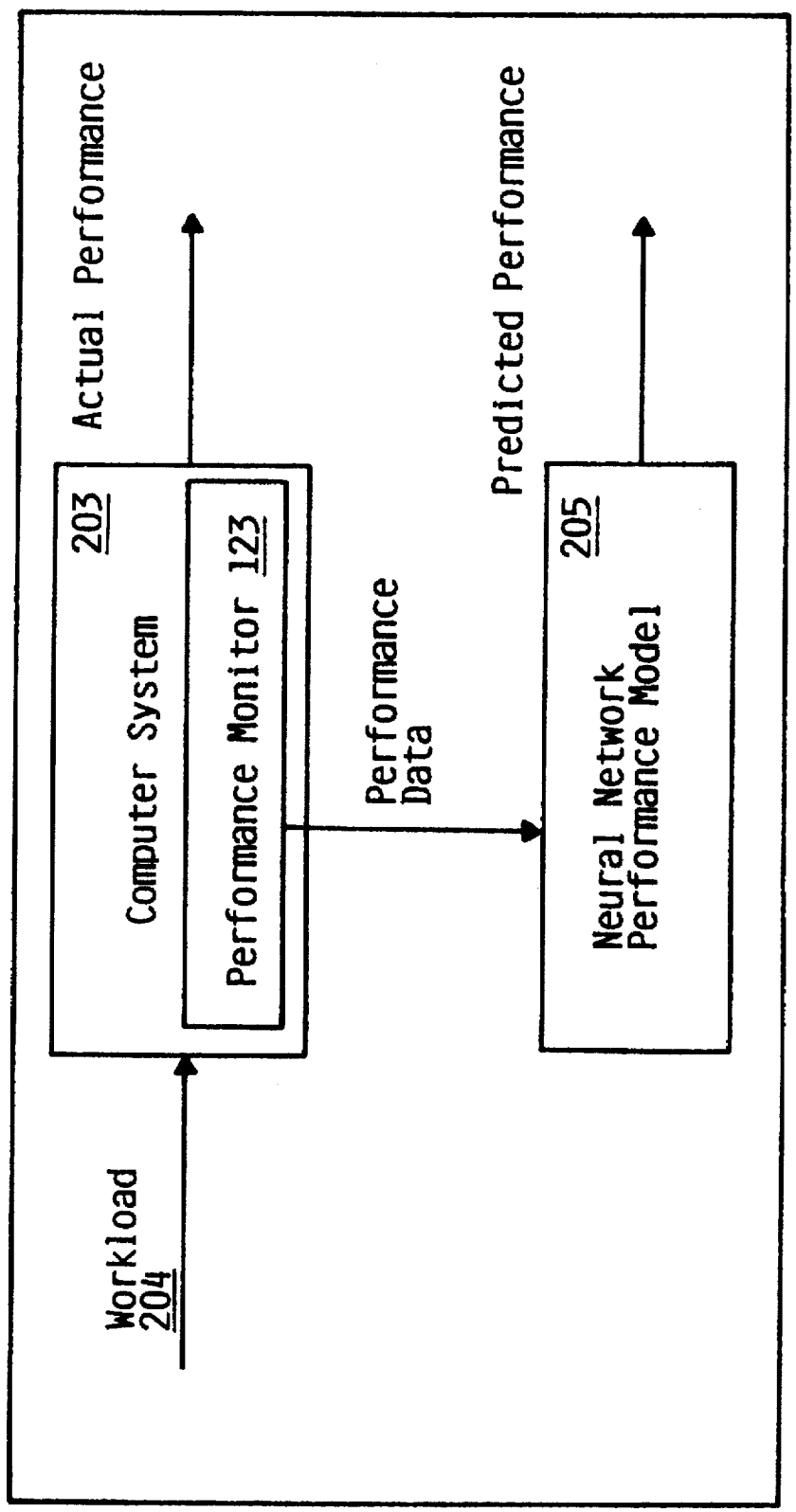
FIG. 4 depicts how a neural network system model is trained according to the preferred embodiment.

FIG. 4 depicts how neural network system model 205 is trained according to the preferred embodiment. Workload 204 enters computer system 203 for service. As the computer system processes this workload, a computer system performance monitor 123 collects data on key performance measurements. This includes information of device utilizations, such as CPU and disk devices, on queue lengths at those devices, on paging characteristics and on system performance such as job throughputs and response times. This data may be written to secondary storage for later processing. Neural network performance model 205 uses the performance monitor data to construct a model of the computer system performance relationships.

Figure 5A:
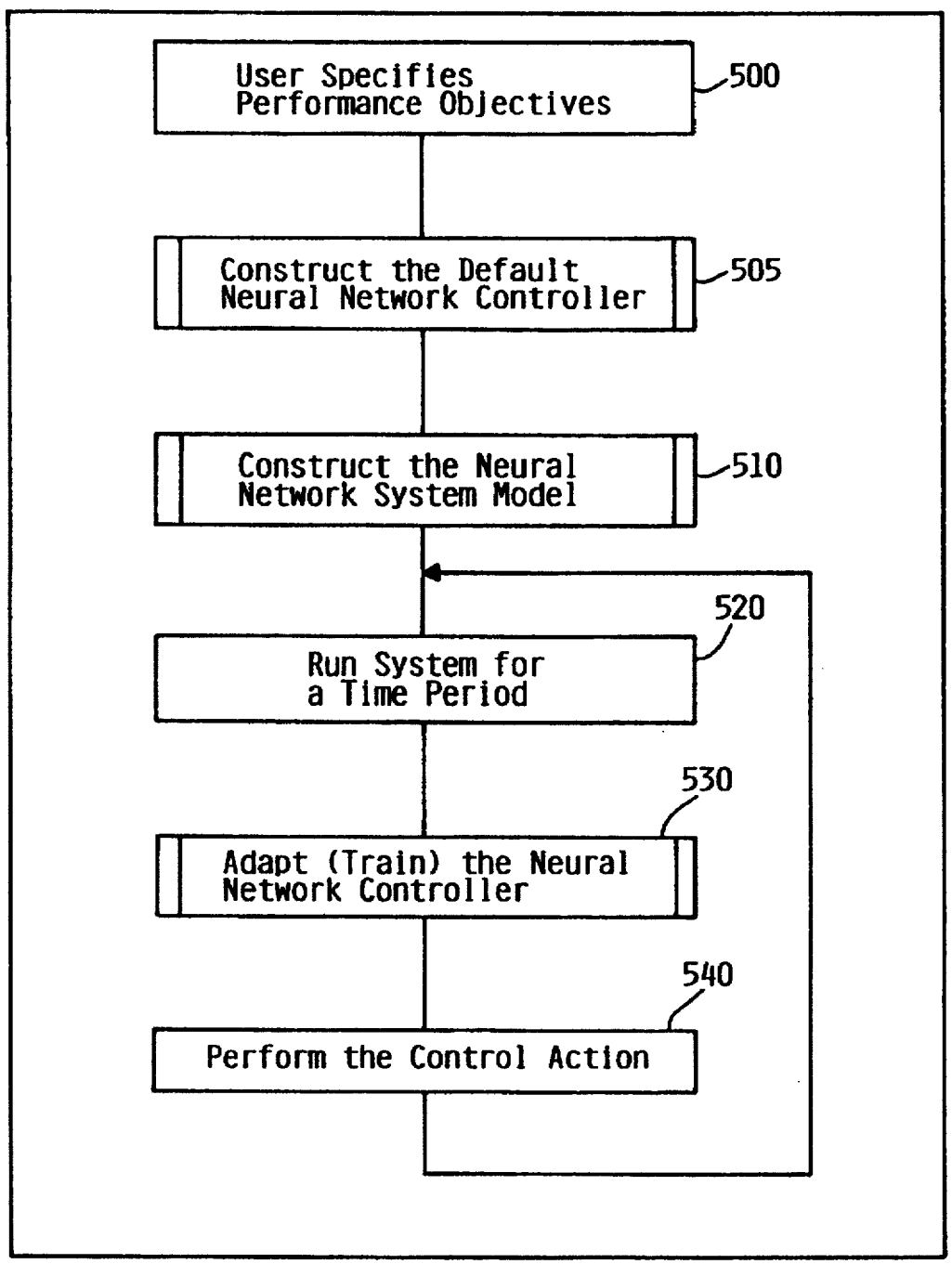
FIGS. 5A, 5B and 5C are flowcharts showing the steps required for operation of the resource controller according to the preferred embodiment.
Figure 5B:
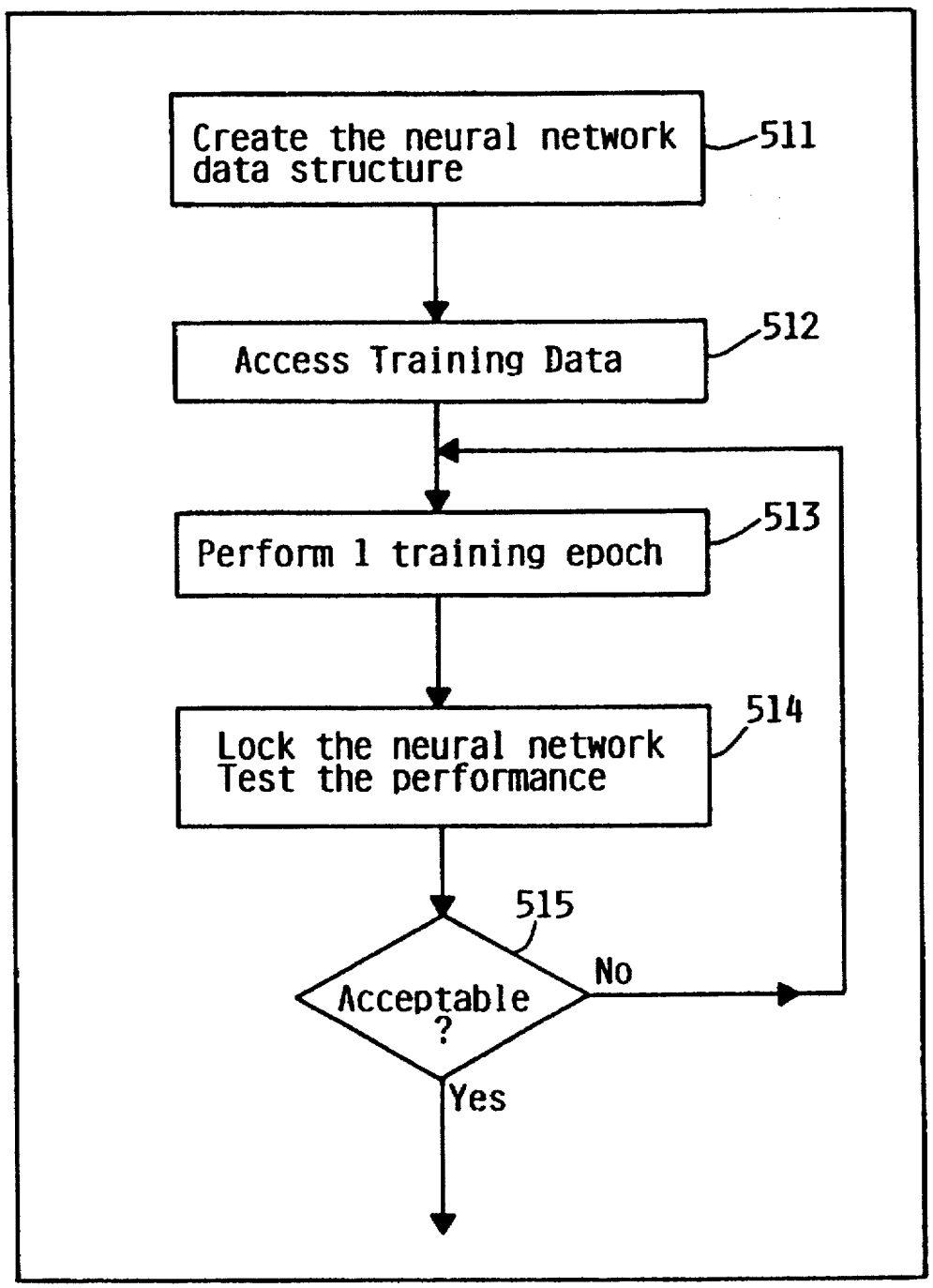
Figure 5C:
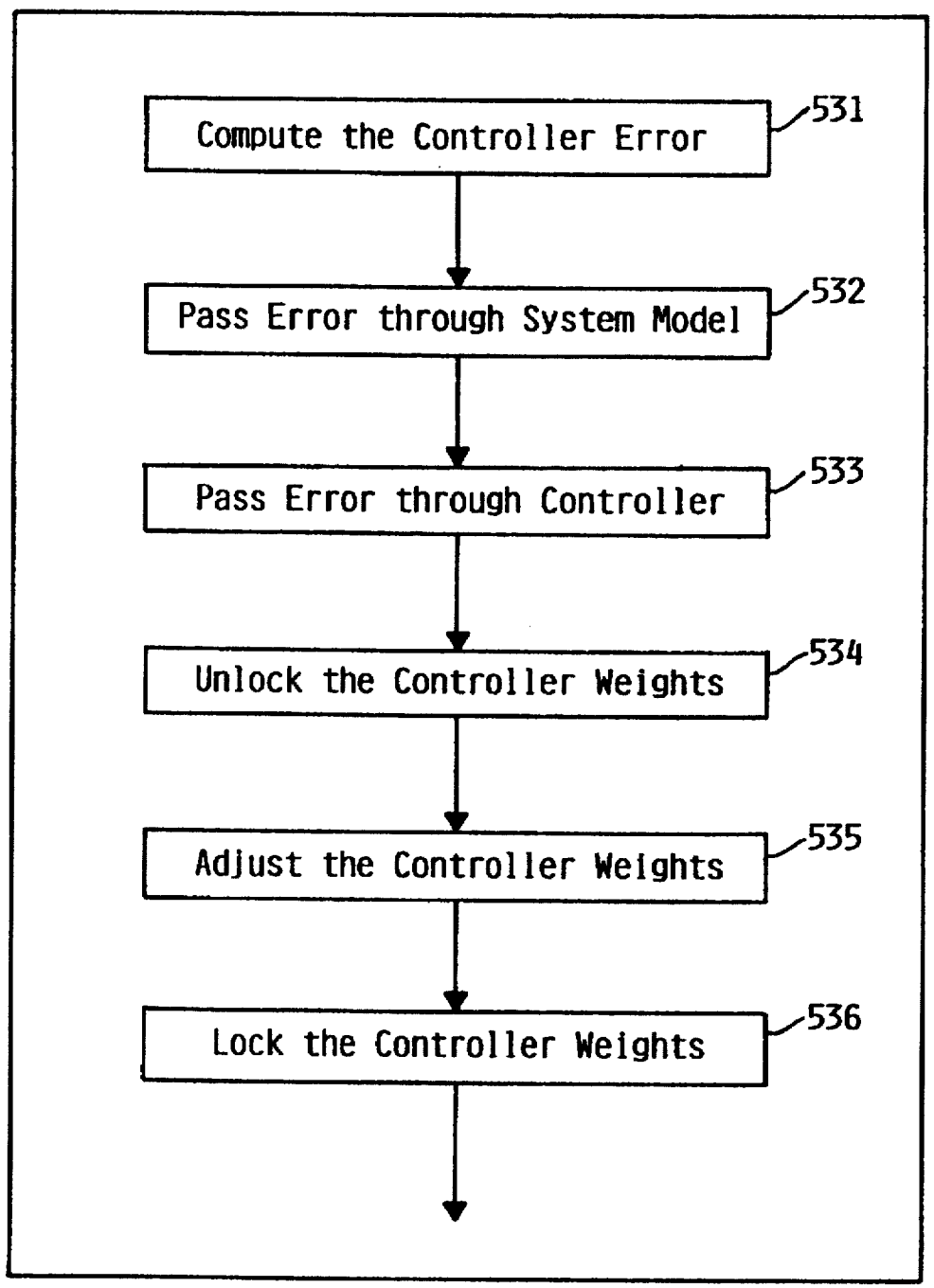

FIGS. 5A, 5B and 5C are flowcharts showing the steps required for operation of the resource controller according to the preferred embodiment. Referring to FIG. 5A, at block 500, the user inputs to the system (e.g., through one of workstations 113–115) the desired performance values for each job class. In the preferred embodiment, this value is the average response time although other performance objectives, such as job throughput, may be specified.

At block 505, resource manager 122 constructs the default neural network controller using the process shown in FIG. 5B and described in the text below. Once constructed, the network can be initialized with random weights or trained to produce median outputs over a range of configurations. Because this default data is used only for an initial set-up of controller neural network 202, it does not necessarily have to be accurate. The layout of the training data for the controller neural network in the preferred embodiment is discussed later herein and shown in FIG. 7.

At block 510, resource manager 122 constructs a neural network system model using the process shown in FIG. 5B and described in the text below. The training data for the system model can be obtained in a variety of ways. In the preferred embodiment, the computer is run in normal operation, with a performance monitor collecting data in a file. The collected data is then used to train the neural network performance model. Alternatively, a simulation of the system could be used to generate various workloads and compute the system performance for various memory configurations. Alternatively, system response could be predicted by experts using queueing theory. An important issue is to cover a range of configurations and the range of expected workloads. In the preferred embodiment, the training of the computer system model is performed off-line. In an alternative embodiment, the neural network performance model is trained on-line, i.e. during normal computer system operation. This may require the use of special neural network coprocessor chips to avoid unacceptable performance degradation.

FIG. 5B shows in greater detail the steps required to create a neural network, as represented in the single blocks 505 and 510. At block 511, neural network utility 124 is invoked to create the neural network data structure 125. The neural network consists of a set of processing elements and adaptive weighted connections. In the preferred embodiment, a feedforward neural network is created and trained, however other neural network architectures (such as recurrent neural networks) and training algorithms could be substituted by those skilled in the art. In the preferred embodiment the neural network is implemented in software running on a general purpose CPU. Neural network utility 124 uses data structures 125, which define the parameters of a neural network, to execute an artificial neural network on CPU 101. An alternative embodiment is to implement the neural network in a custom neural network processing chip.

At block 512, utility 124 accesses the neural network training data which is in data performance files 126 created by performance monitor 123 during normal computer system operation. This training data comprises a set of records, each containing information on the computer system configuration, workload, and performance. For example, this data may include information on the current setting of operating system parameters such as multiprogramming levels and memory buffer sizes. It may include information such as device utilizations, mean queue lengths, and mean paging rates. The performance data may include information on average job response times and throughputs. Other pertinent configuration and performance data could be added as deemed necessary by those skilled in the art. In the preferred embodiment, this training data is split into 2 sets, one (80% of the data records) for use while adapting the neural network weights, and one (the remaining 20% of the data) for use as a holdout or test data set.

At block 513 performs a single training epoch or pass through the training data. During the training phase, each record is presented to the neural network. FIG. 6 shows the layout of the training data for neural network system model 205 in the preferred embodiment; FIG. 7 shows the layout for controller neural network 202. Referring now to FIG. 3, in the forward pass, the inputs are multiplied by the connection weights to the first layer of hidden units, and summed by each hidden unit 311-314. Each hidden unit then passes the sum through a nonlinear activation function. This process is repeated for any additional hidden layers, until the output of the neural network is computed at the final or output layer. The difference between the desired and actual output values is used by a learning algorithm to adjust the connection weights. In the preferred embodiment, the backward error propagation algorithm (Rumelhart, Williams, and Zipser, 1986) is used to adjust the values of the connection weights. However, there are many neural network training algorithms which could be used with equivalent results. The goal in the training phase is to adjust the weights in the neural network so that it reproduces the performance behavior of the real computer system (in the case of the system model), or produces optimum configurations (in the case of the controller).

At block 514, the connection weights of the neural network are locked so that they are not adjusted. During the testing phase, each record in the test data set is presented to the neural network and the errors between the actual performance data and the neural network prediction are measured.

Decision block 515 tests whether the neural network system model performance is acceptable. If the errors are within the acceptable range (for example, less than 10% average prediction error), then the training process is stopped. Otherwise, the neural network is unlocked so the connection weights can be adjusted and the process repeats from block 513.

Referring now to FIG. 5A, block 520 represents the normal operation of the computer system with the current workload. The computer system is subjected to a workload and performance monitor 123 collects data on the workload and actual system performance during this period, storing the data in performance data files 126.

At block 530 resource manager 122 calls neural network utility 124 to adapt controller neural network 202, using the error between the desired and actual system performance. In the preferred embodiment, the error is back propagated through the system model and then used to train the controller neural network. This process is shown in greater detail in FIG. 5C.

Referring now to FIG. 5C, at block 531 the difference between the desired performance objectives and actual performance is computed, producing an error vector. This vector of errors is used as the error in the output layer of neural network system model 205. In the preferred embodiment, neural network utility 124 performs a backward pass of the standard backward error propagation algorithm, resulting in the computation of the system model input errors, at block 532. This error information contains direction and magnitude information on the errors coming out of controller neural network 202. The input error vector is used as the error in the output layer of controller neural network 202 at block 533. At block 534 the connection weights in controller neural network 202 are unlocked. At block 535, utility 124 performs a backward pass of the standard backward error propagation algorithm and the controller neural network weights are adjusted. The connection weights of controller neural network 202 are then locked at block 536.

Referring now back to FIG. 5A, a specified control action is performed at block 540 In the preferred embodiment, controller neural network 202 specifies the amount of memory allocated for the job pools, i.e. segments of the computer's memory allocated to jobs of a particular class. There is one output for each of the job pools. In the preferred embodiment, the controller outputs are normalized by summing them and then dividing each output value by their sum. This produces values representing the proportion of the resource each respective pool should be allocated. The actual size of the memory buffer is computed by taking the percentage control output and multiplying it by the total amount of available memory. Resource manager 122 then calls appropriate operating system functions to change the memory allocations. Once the control function is performed at block 540, the system resumes normal running at block 520, but with the new memory configuration.

FIG. 6 shows the layout of the training data for neural network system model 205 used in the preferred embodiment. The training data is collected by performance monitor 123 while the system is processing a normal workload. A variety of system configurations must be used in order to capture the dynamics of the computer system performance over a range of operation. The training data consists of two major elements, the input data and the output or target data. The input data contains parameters representing the current system configuration and the current system workload. The system configuration in the preferred embodiment contains parameters describing the multiprogramming level (mpl) and the memory allocations (denoted as PoolSize) for each of the four job partitions. The current system workload includes parameters describing average device utilizations, CPU and I/O mean queue lengths, and the average page fault rates. The output data contains parameters representing the system performance measures which the model is learning to predict. In the preferred embodiment, this is the average job response times (in seconds) for each job class. The data values shown at the bottom of the figure are the raw data. These values are scaled to a range of 0.0 to 1.0. Alternative embodiments could include additional information on the system configuration, workload, or other performance measures.

The target data for neural network training is the actual measured computer system performance measures. This process of training the neural network performance model can be done on-line, that is the model is trained concurrently with computer system operation, or it can be done off-line. In off-line mode, the computer system performance data is collected and saved into a data file. Later during off-peak hours, the neural network performance model is trained using back propagation or any other appropriate supervised learning algorithm.

FIG. 7 shows the layout of the training data for controller neural network 202 of the preferred embodiment. The training data is collected by performance monitor 123 while the system is processing a normal workload. The training data consists of two major elements, the input data and the output or target data. The input data contains parameters representing the current system configuration, the current system workload, and the recent system performance. The system configuration in the preferred embodiment includes parameters describing the multiprogramming level (mpl) and the memory allocations (denoted as PoolSize) for each of the four job partitions. The current system workload contains parameters describing average device utilizations, CPU and I/O mean queue lengths, and the average page fault rates. The recent system performance in the preferred embodiment includes the current response times and the previous response times. This temporal information gives the controller data on whether the response times are getting closer or farther from specified objectives. The output data contains parameters representing the system controls which are to be adjusted. In the preferred embodiment, this is the allocation of available memory to the four memory pools. The data values shown at the bottom of the figure are the raw data. These values are scaled to a range of 0.0 to 1.0. Alternative embodiments could include additional information on the system configuration, workload, system performance, or other system controls.

Additional background information concerning the operation of neural network utility 124 can be found in Neural Network Utility/400: User's Guide (IBM Publication No. SC41-8202) and in Neural Network Utility/400: Programmer's Reference (IBM Publication No. SC41-0032), herein incorporated by reference. Additional background information concerning the operation of performance monitor 123 and the interpretation of performance data 126 can be found in Programming: Performance Tools Guide (IBM Publication No. SC21-8084) and Programming: Work Management Guide (IBM Publication No. SC21-8078), herein incorporated by reference. All of these publications are available from IBM Corporation.

Additional background information concerning the present invention can be found in a Ph.D. thesis by Joseph P. Bigus entitled, "Adaptive Operating System Control Using Neural Networks", presented to Lehigh University, a copy of which is appended hereto and incorporated herein by reference.

Figure 8:
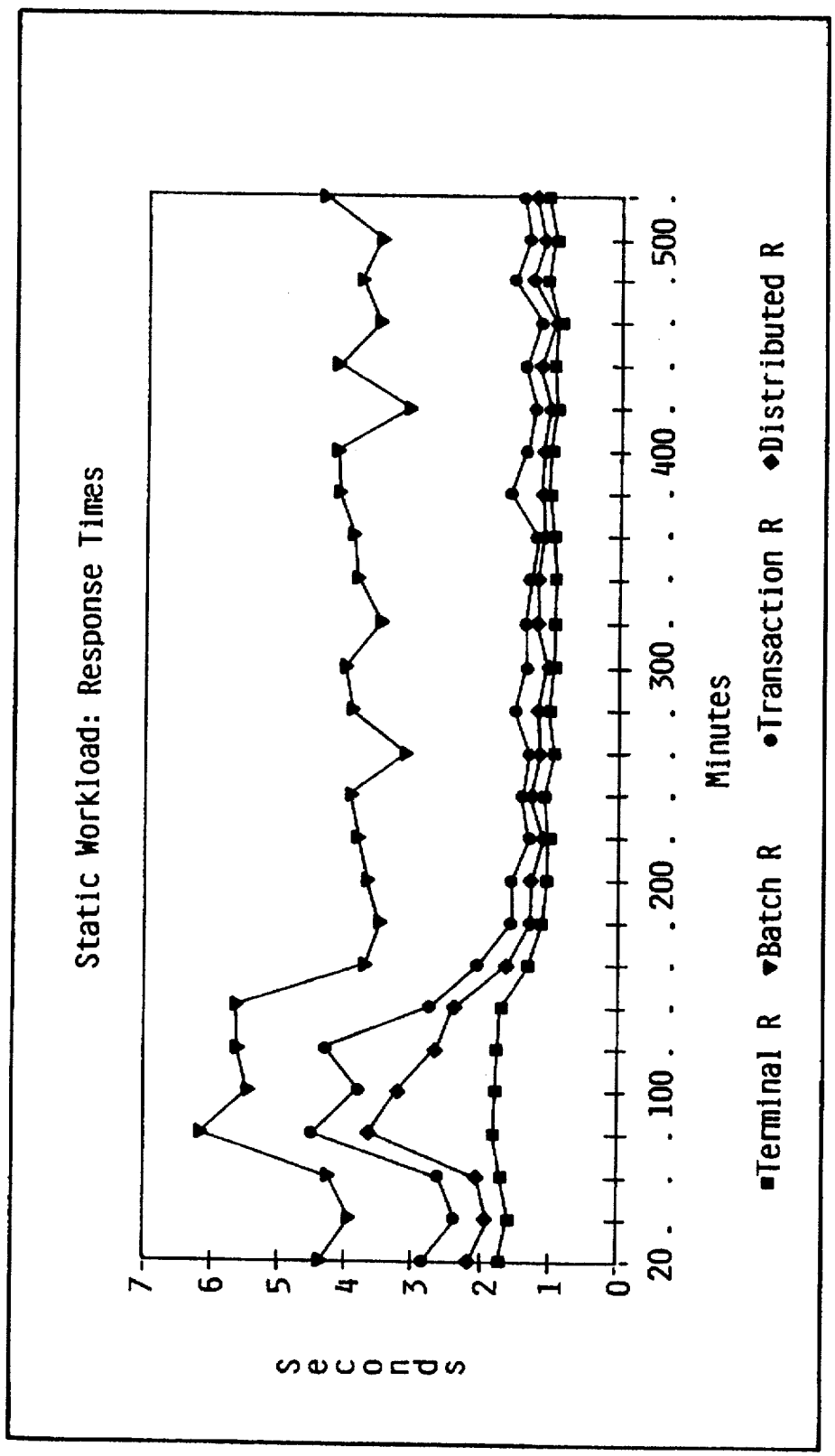
FIG. 8 and FIG. 9 show an example of response times and the corresponding control actions taken by the controller of the preferred embodiment under a constant workload.
Figure 9:
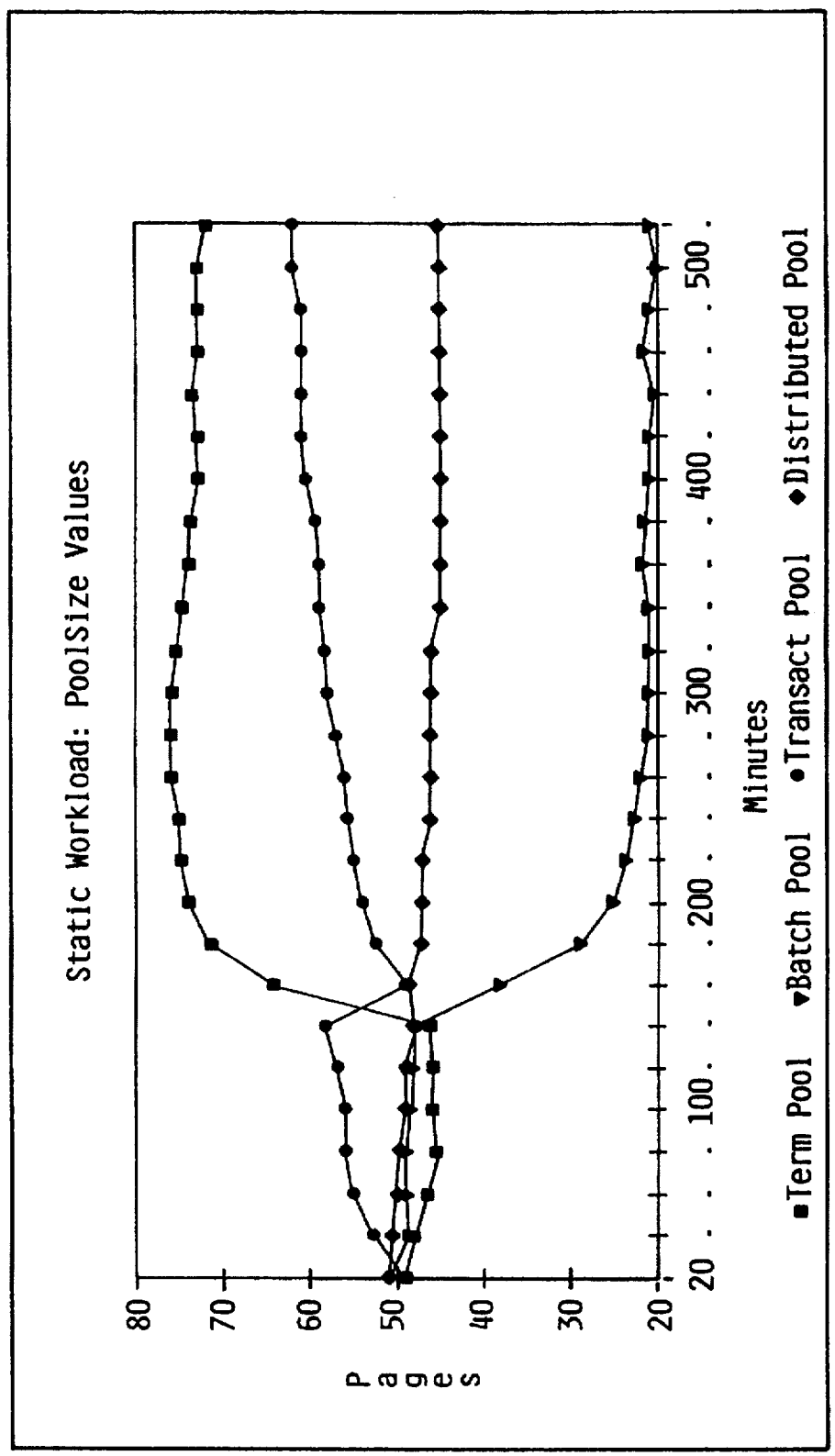

FIG. 8 and FIG. 9 show an example of response times and the corresponding control actions taken by the controller of the preferred embodiment under a constant workload. FIG. 8 shows the response times of the jobs in each job class as controller neural network 202 learns to adjust the amount of memory allocated to each job class. The specified performance objectives in this example are average job response times of 1.0, 3.0, 1.5 and 1.0 seconds for terminal, batch, transaction and distributed jobs, respectively.

FIG. 9 shows the control actions taken in response to output of controller neural network 202 to achieve the response times shown in FIG. 8. The neural network controller has 4 outputs. Each output represents the memory available to each job class, with a total of 200 pages of memory to be allocated. The neural network controller learns to adjust the poolsizes in order to meet the specified performance objectives, without exceeding the available memory.

Figure 10:
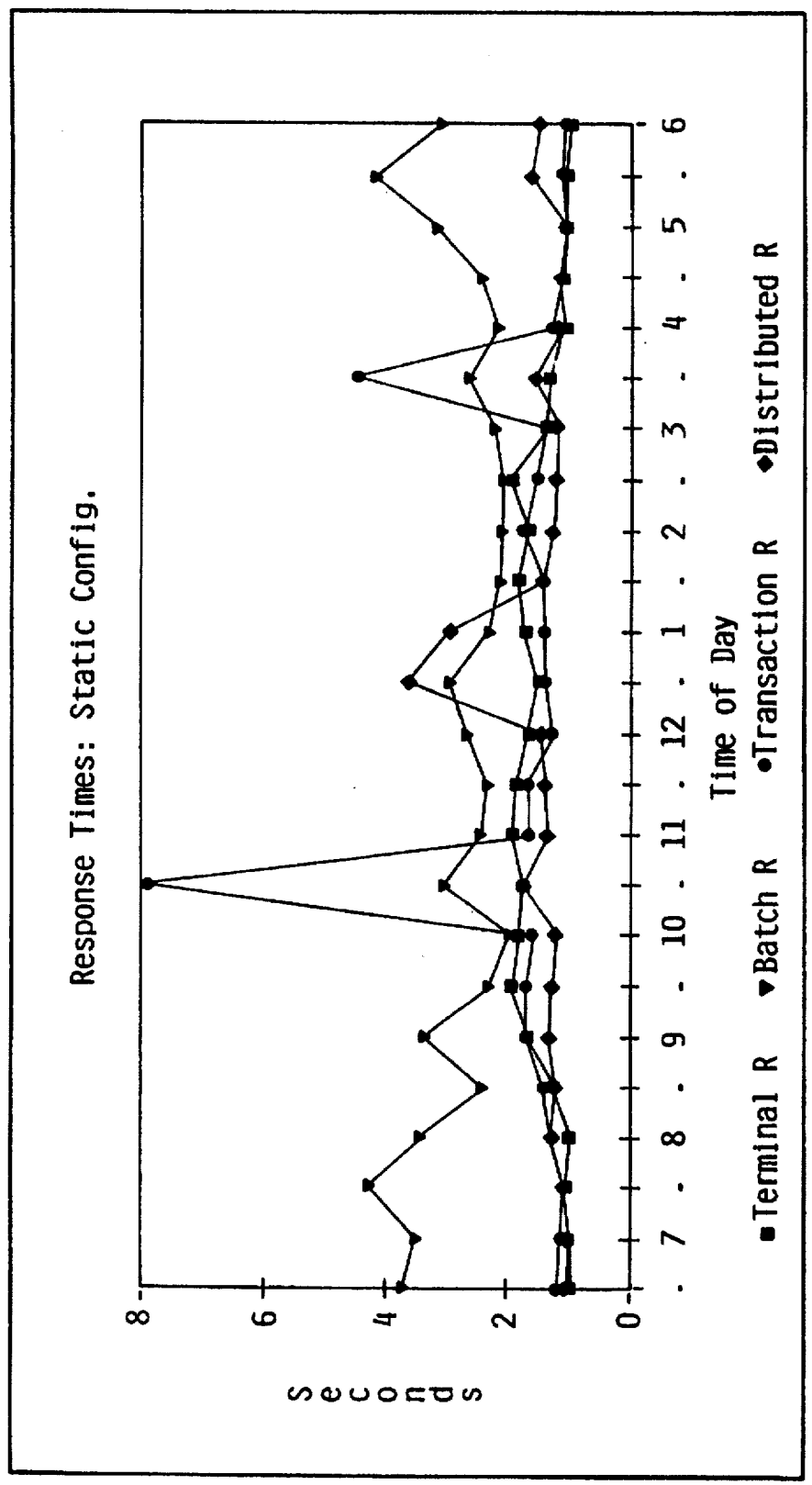
FIG. 10 shows the system response times to a standard 12 hour workload consisting of 4 job classes in a second example.
Figure 11:
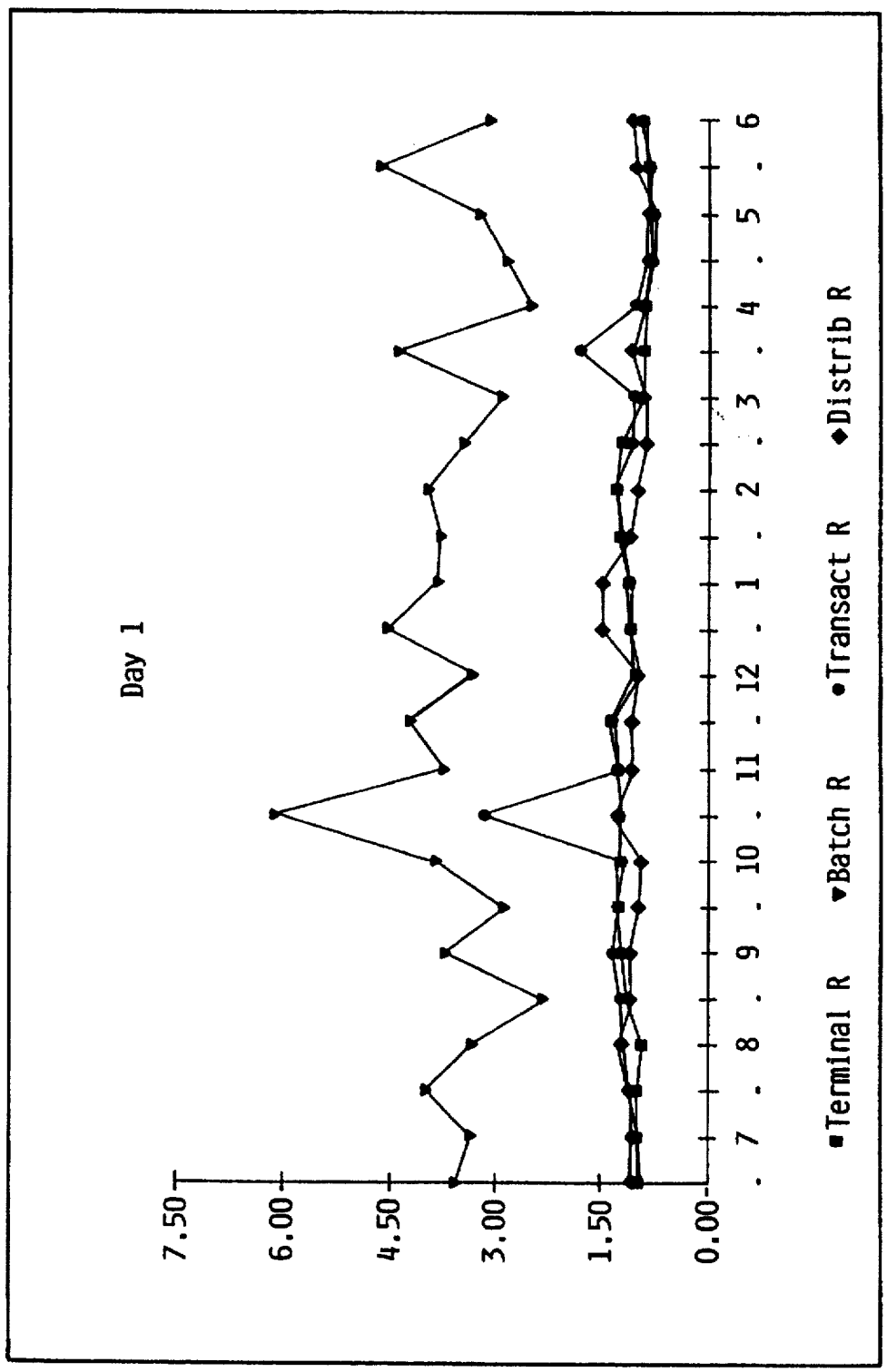
FIG. 11 and FIG. 12 show the response times and the control actions taken by the neural network controller of the preferred embodiment over the 12 hour period of the second example.
Figure 12:
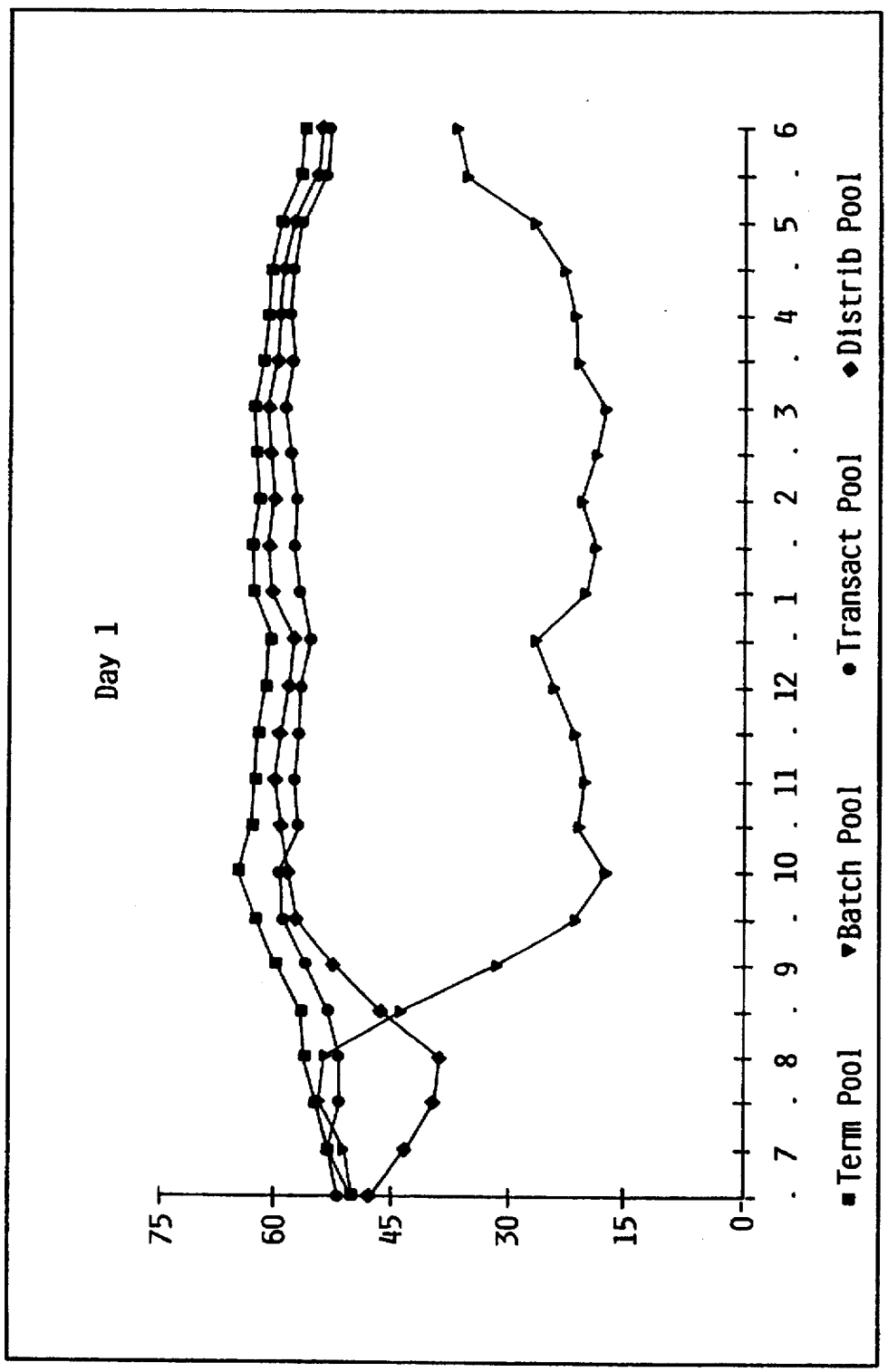

FIGS. 10, 11 and 12 show another example of the performance control exhibited by the adaptive operating system controller of the preferred embodiment. In FIG. 10 is shown the response times for a computer system with a workload from four job classes changing over a 12 hour workday. The configuration in this example is static. As can be seen there are severe disruptions in response times during the 10:00 to 10:30 and 3:00 to 3:30 periods for the transaction job class.

FIG. 11 shows the performance of the computer system after a sequence of control actions taken in response to the output of controller neural network 202. After only one day of operation the neural network is able to smooth out the peaks in response time and is providing much better system response. The target response times in this example were 1.0, 4.0, 1.5, and 1.0 for terminal, batch, transaction and distributed jobs, respectively.

FIG. 12 shows the control actions taken by the neural network controller. As can be seen, the memory sizes are adjusted throughout the day to accommodate workload changes.

Figure 13:
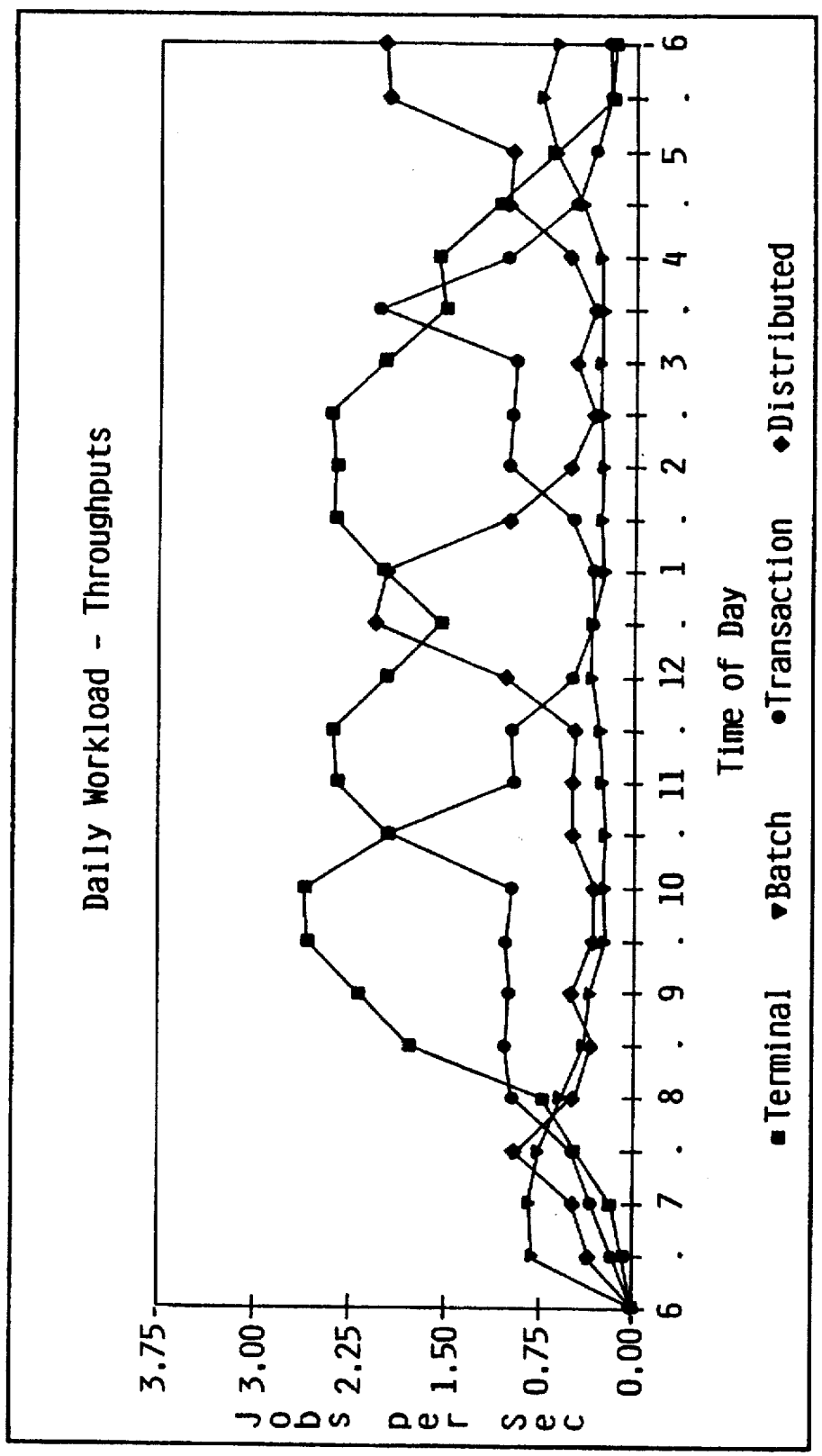
FIG. 13 and FIG. 14 show the job class throughputs and computer system device utilizations for the standard workload used in the second example.
Figure 14:
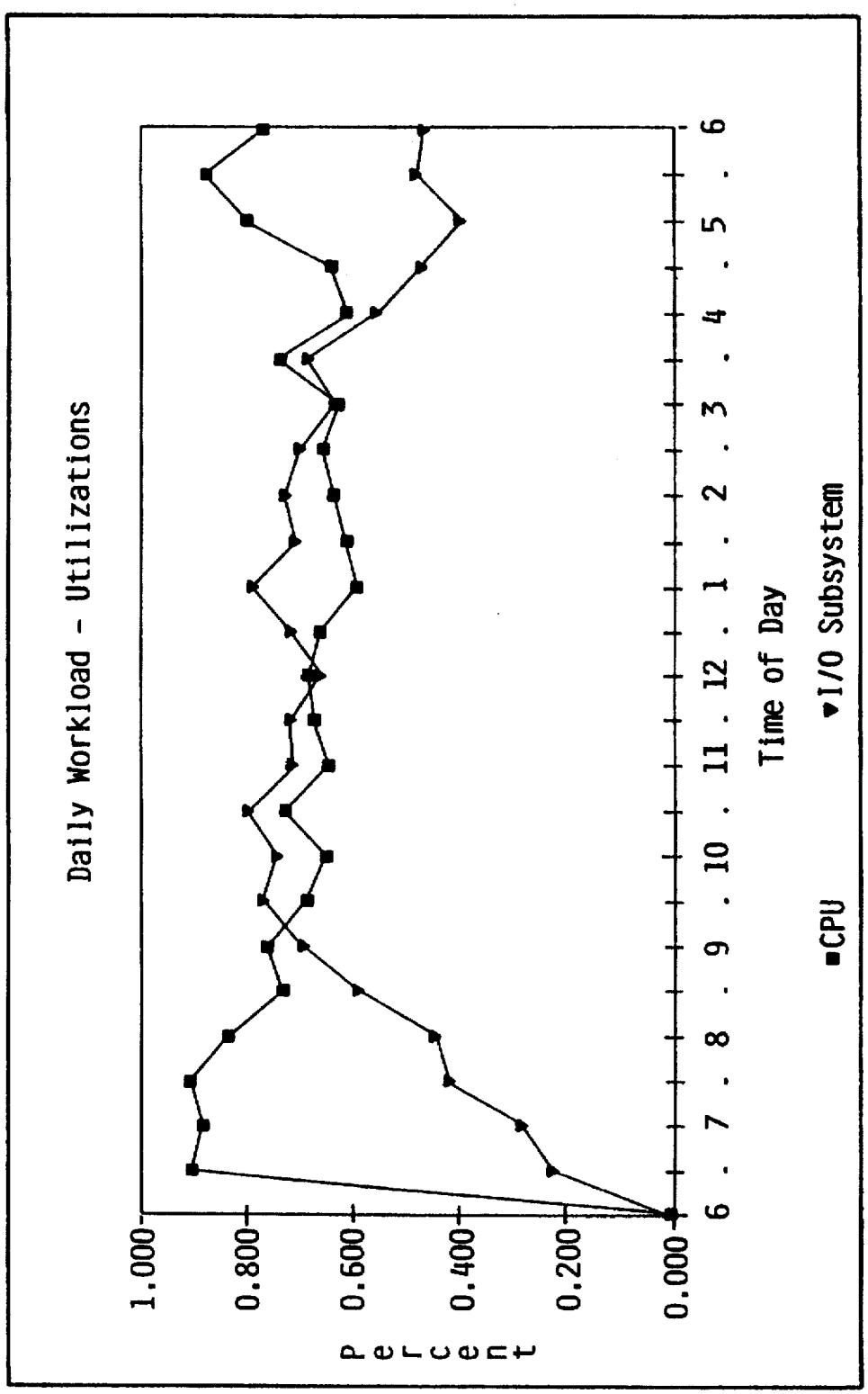

FIG. 13 shows the throughput of the 4 job classes with a static system configuration (i.e., the example of FIG. 10). The memory is divided equally between the four job classes. FIG. 14 shows the utilization of the computer system CPU and I/O devices when presented with this standard workload.

In the preferred embodiment, the resource allocation controller is used to allocate resources of a computer system, particularly, to allocate memory. However, a resource allocator according to the present invention could be used for many other types of resources in many other environments.

For example, the controller could be used to allocate other resources within the computer system, such as access to I/O devices, communications channels, available storage, etc. Additionally, the resource allocation controller of the present invention could be used to allocate non-computer resources within a system which is not a computer. For example, it might be used to allocate resources on an assembly line within a factory (system), as for example, by assigning a variable number of workers to particular tasks or workstations. Any system having a pool of resources capable of allocation, which are used to perform useful work, might conceivably benefit from the present invention.

In the preferred embodiment, a system model neural network is used to generate training data for the controller neural network. However, in an alternative embodiment, training data for the controller neural network could be obtained in other ways. For example, it may be possible to generate training data from a different model (i.e., a model which is not a neural network).

In the preferred embodiment, the resource controller is driven by a neural network and uses feedback from actual performance results of the computer system. However, the present invention is not necessarily limited to a neural network based implementation of the resource controller, and in a broader sense the present invention may be viewed as the application of closed loop feedback design principles to resource allocation in a computer system. Such principles are known in the design of simple electrical control systems having one or two parameters, but have heretofore been too difficult to apply to something so complex as resource allocation in a computer operating system. Within the scope of the present invention, it may be possible to construct alternative embodiments, in which a feedback loop is used to adjust the parameters of some other form of resource controller which does not employ neural network technology.

In an additional alternative embodiment, the neural network based system model of the present invention could be used for purposes other than the adaptive resource controller described herein. It may be used to adapt other neural networks performing other forms of control, or it may be used for other tasks requiring an accurate and adaptable system model.

Although a specific embodiment of the invention has been disclosed along with certain alternatives, it will be recognized by those skilled in the art that additional variations in form and detail may be made within the scope of the following claims.

What is claimed is:

1. A method for controlling the response of a computer system to a workload and configuration, comprising the steps of:

gathering performance data for jobs in a plurality of job classes from said computer system, said performance data including workload data and configuration data for a plurality of time intervals, and further including computer system response data for said plurality of intervals, wherein the jobs in the plurality of job classes require different amounts of computer system resources;

constructing a neural network, said neural network having a set of inputs corresponding to the workload and configuration of said computer system, and having at least one output corresponding to response of said computer system;

training said neural network with said performance data gathered from said computer system to produce a trained neural network model of said computer system;

determining the response of said computer system from the output of said trained neural network; and allocating the resources in said computer system among the plurality of job classes based on said response from said determining step and based on performance objectives for each job class specified by a user of said computer system.

* * * * *